(12) United States Patent
Dutta et al.

(10) Patent No.: US 11,951,801 B2
(45) Date of Patent: Apr. 9, 2024

(54) VEHICLE AIR CONDITIONING DEVICE HOT WATER PIPE HOLDING STRUCTURE

(71) Applicant: Valeo Japan Co., Ltd., Saitama (JP)

(72) Inventors: Soumya Dutta, Saitama (JP); Yukio Suzuki, Saitama (JP)

(73) Assignee: Valeo Japan Co., Ltd., Saitama (JP)

( * ) Notice: Subject to any disclaimer, the term of this patent is extended or adjusted under 35 U.S.C. 154(b) by 275 days.

(21) Appl. No.: 17/473,391

(22) Filed: Sep. 13, 2021

(65) Prior Publication Data

US 2022/0080802 A1 Mar. 17, 2022

(30) Foreign Application Priority Data

Sep. 14, 2020 (JP) .................................. 2020-153541
Dec. 23, 2020 (JP) .................................. 2020-213131

(51) Int. Cl.
*B60H 1/00* (2006.01)
*F16L 3/10* (2006.01)

(52) U.S. Cl.
CPC ..... *B60H 1/00528* (2013.01); *B60H 1/00521* (2013.01); *B60H 1/00571* (2013.01); *F16L 3/10* (2013.01)

(58) Field of Classification Search
CPC F16L 3/10; F16L 3/237; F16L 3/1091; B60H 1/00528; B60H 1/00521; B60H 1/00571; B60H 2001/006
See application file for complete search history.

(56) References Cited

U.S. PATENT DOCUMENTS

| 2014/0174582 | A1* | 6/2014 | Kehimkar | B60H 1/00571 248/65 |
| 2015/0328957 | A1* | 11/2015 | Baek | B60H 1/00521 62/515 |
| 2017/0009912 | A1* | 1/2017 | Berger | B60H 1/00521 |
| 2017/0217392 | A1* | 8/2017 | Hoffmann | B60H 1/00521 |
| 2019/0084371 | A1* | 3/2019 | Tominaga | B60H 1/00528 |
| 2019/0092124 | A1* | 3/2019 | Ferrer | B60H 1/00521 |
| 2019/0118612 | A1* | 4/2019 | Ferrer | B60H 1/00528 |
| 2019/0315189 | A1* | 10/2019 | Kim | B60H 1/00528 |

FOREIGN PATENT DOCUMENTS

JP 2006-168608 A 6/2006

* cited by examiner

*Primary Examiner* — David Bochna
(74) *Attorney, Agent, or Firm* — Osha Bergman Watanabe & Burton LLP

(57) ABSTRACT

A vehicle air conditioning device includes a case, disposed inside a vehicle cabin separated from a forward compartment by a dash panel, in which an internal space (11a) is formed, a heater core that is disposed in the internal space, a hot water supply pipe that can supply hot water to the heater core, a hot water collecting pipe that can collect hot water that has passed through an interior of the heater core, and a holder member that holds the hot water pipes. The holder member includes a first holding portion that comes into contact with the hot water pipes, and a second holding portion that opposes the first holding portion, is provided across a gap, and comes into contact with the hot water pipes.

8 Claims, 7 Drawing Sheets

VEHICLE AIR CONDITIONING DEVICE HOT WATER PIPE HOLDING STRUCTURE

BACKGROUND OF THE INVENTION

1. Field of the Invention

The present invention relates to a holding structure of a hot water pipe that causes hot water to be circulated to a vehicle air conditioning device.

2. Description of the Related Art

A type of heater such that hot water fed from an engine room is supplied to a heater core disposed in a vehicle cabin, and the hot water is returned to the engine room after a heat exchange, is known as a heater of a vehicle air conditioning device. As existing technology relating to this kind of vehicle air conditioning device, there is technology disclosed in Patent Literature 1.

A vehicle air conditioning device disclosed in Patent Literature 1 has a case disposed in a vehicle cabin, a hot water supply pipe that can supply hot water to a heater core disposed inside the case, and a hot water collecting pipe that can collect hot water that has passed through an interior of the heater core. The hot water supply pipe and the hot water collecting pipe are held in front of the case by a sealing member holder.

Patent Literature 1: JP-A-2006-168608

As disclosed in Patent Literature 1, the hot water supply pipe and the hot water collecting pipe (hereafter collectively referred to as "hot water pipes") extend from an engine room to the vehicle cabin. Apart that generates a large vibration, such as an engine, is housed in the engine room. In addition to this, vibration is also generated by the vehicle traveling. One portion of the vibration generated inside the engine room may be transmitted via the hot water pipes to the vehicle air conditioning device case or the like. There is concern that vibration transmitted to the case or the like will be transmitted to an occupant as an unpleasant noise.

SUMMARY OF THE INVENTION

An object of the invention is to increase quietness in a vehicle cabin of a vehicle air conditioning device having a hot water pipe.

In the following description, reference signs from the attached drawings are added in parentheses in order to facilitate understanding of the invention, but the invention is not thereby limited to aspects shown in the drawings.

The present disclosure provides a vehicle air conditioning device hot water pipe holding structure having a case (11), disposed inside a vehicle cabin (C) separated from a forward compartment (R) by a dash panel (51), in which an internal space (11a) is formed, a heater core (12) that is disposed in the internal space (11a) and can warm air that flows into the internal space (11a), a hot water supply pipe (13) that is provided in an exterior of the case (11) and can supply hot water to the heater core (12), a hot water collecting pipe (14) that is provided in an exterior of the case (11) and can collect hot water that has passed through an interior of the heater core (12), and a holder member (20, 20B) that holds the hot water supply pipe (13) and the hot water collecting pipe (14), the vehicle air conditioning device hot water pipe holding structure being characterized in that the holder member (20, 20B) has a first holding portion (30, 30B) that comes into contact with the hot water supply pipe (13) and the hot water collecting pipe (14), a second holding portion (40, 40B) that opposes the first holding portion (30, 30B), is provided across a gap, and comes into contact with the hot water supply pipe (13) and the hot water collecting pipe (14), and a fastening portion (23) that fastens the first holding portion (30, 30B) and the second holding portion (40, 40B), the first holding portion (30, 30B) has a first supply side holding portion (31) that presents an approximate U-form following an outer peripheral face of the hot water supply pipe (13) and holds the hot water supply pipe (13), and a first collection side holding portion (32) that presents an approximate U-form following an outer peripheral face of the hot water collecting pipe (14) and holds the hot water collecting pipe (14), and the second holding portion (40, 40B) has a second supply side holding portion (41) that presents an approximate U-form following an outer peripheral face of the hot water supply pipe (13) and holds the hot water supply pipe (13), and a second collection side holding portion (42) that presents an approximate U-form following an outer peripheral face of the hot water collecting pipe (14) and holds the hot water collecting pipe (14).

According to the invention, quietness in a vehicle cabin of a vehicle air conditioning device having a hot water pipe can be increased.

DESCRIPTION OF THE PREFERRED EMBODIMENTS

Figure 1:
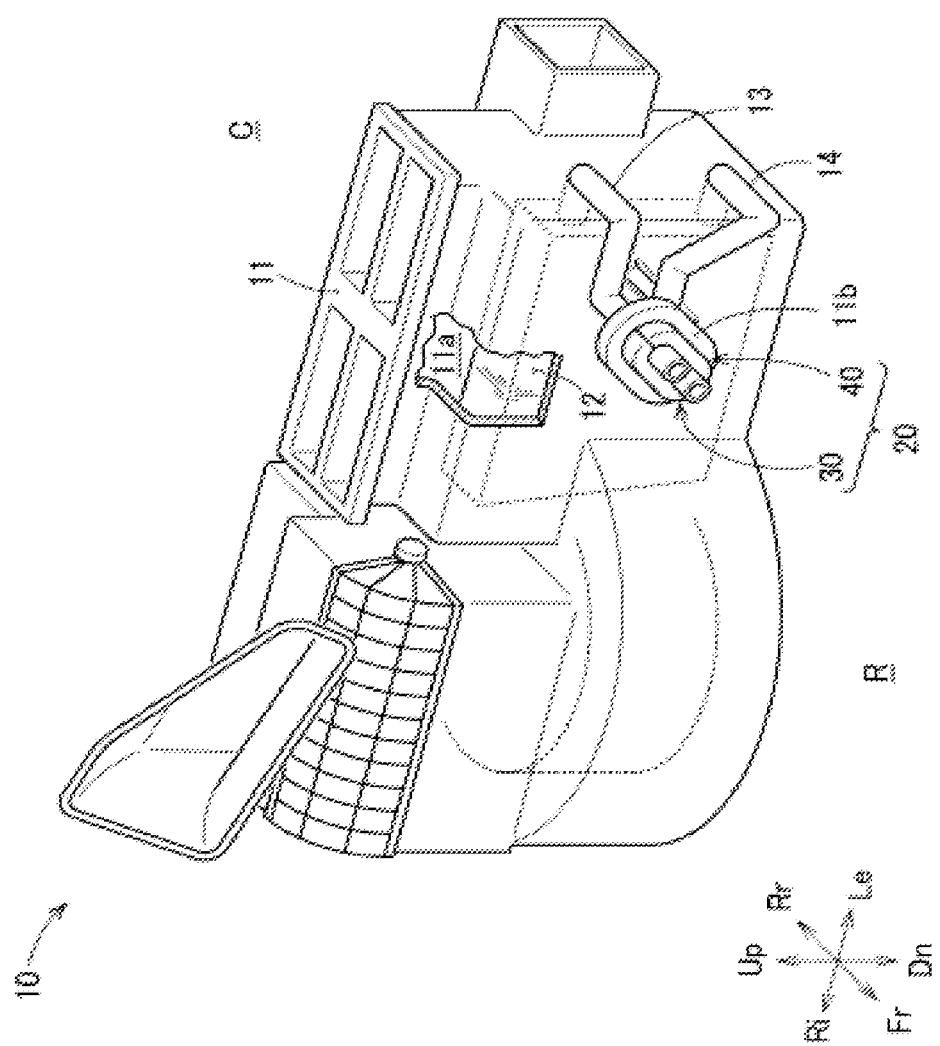
FIG. 1 is a perspective view of a vehicle air conditioning device according to a first working example.

Hereafter, an embodiment of the invention will be described based on the attached drawings. Fr in the drawings indicates a front with respect to a direction of travel of a vehicle, Rr represents a rear with respect to the direction of travel of the vehicle, Le indicates left as seen by an occupant, Ri indicates right as seen by the occupant, Up indicates up, and Dn indicates down.

First Working Example

Reference will be made to FIG. 1. A vehicle air conditioning device 10 (hereafter written as "air conditioning device 10") is shown in FIG. 1. A main portion of the air conditioning device 10 is disposed inside a vehicle cabin C in which an occupant rides. A forward compartment R in which an engine is housed is formed in front of the air conditioning device 10. The vehicle cabin C and the front compartment R are divided by a dash panel, which is a plate-form member. The dash panel will be described hereafter.

When an engine is housed, the forward compartment R is a region generally called an engine room. As a vehicle in which the air conditioning device 10 is mounted is not limited to being a vehicle having an engine as a power source, the term "forward compartment R" is used.

The air conditioning device 10 has a case 11 wherein air is fed into an internal space 11a, a heater core 12, disposed in the internal space 11a, for warming air that has been fed in, a hot water supply pipe 13 that is connected to the heater core 12 from an exterior of the case 11 and can supply hot water to the heater core 12, a hot water collecting pipe 14 that is connected from the heater core 12 to the exterior of the case 11 and can collect hot water that has passed through an interior of the heater core 12, and a holder member 20 that holds the hot water supply pipe 13 and the hot water collecting pipe 14. Hereafter, the hot water supply pipe 13 and the hot water collecting pipe 14 may be referred to collectively as "hot water pipes 13 and 14".

The case 11 has a protruding portion 11b that protrudes toward the holder member 20. A front end of the protruding portion 11b is raised along a rear face of the holder member 20. In addition to the heater core 12, commonly known parts such as a scroll fan for carrying out air feeding and an evaporator for cooling air that has been fed in are housed in the case 11. Air whose temperature has been regulated in an interior of the case 11 is fed to the vehicle cabin C, thereby regulating the inside of the vehicle cabin C to an appropriate temperature.

The internal space 11a is formed in a cavity form, and configures one portion of an air flow path.

The heater core 12 is a commonly known heater core having a large number of tubes through whose interiors hot water flows, is configured of a metal such as an aluminum alloy, and heats air that has been fed in using heat of the hot water.

The hot water pipes 13 and 14 are both pipe-form members made of metal. As a difference in volume before and after a heat exchange is small, the hot water pipes 13 and 14 are both of the same diameter. The hot water pipes 13 and 14 can also be configured of another material, such as a resin, and can be of differing diameters.

The hot water supply pipe 13, for example, supplies hot water warmed in an engine to the heater core 12, and the hot water collecting pipe 14 returns the hot water to the engine after a heat exchange is finished in the heater core 12. The hot water returned to the engine is warmed when cooling the engine, and one portion or a whole thereof is supplied to the heater core 12 again.

Figure 3:
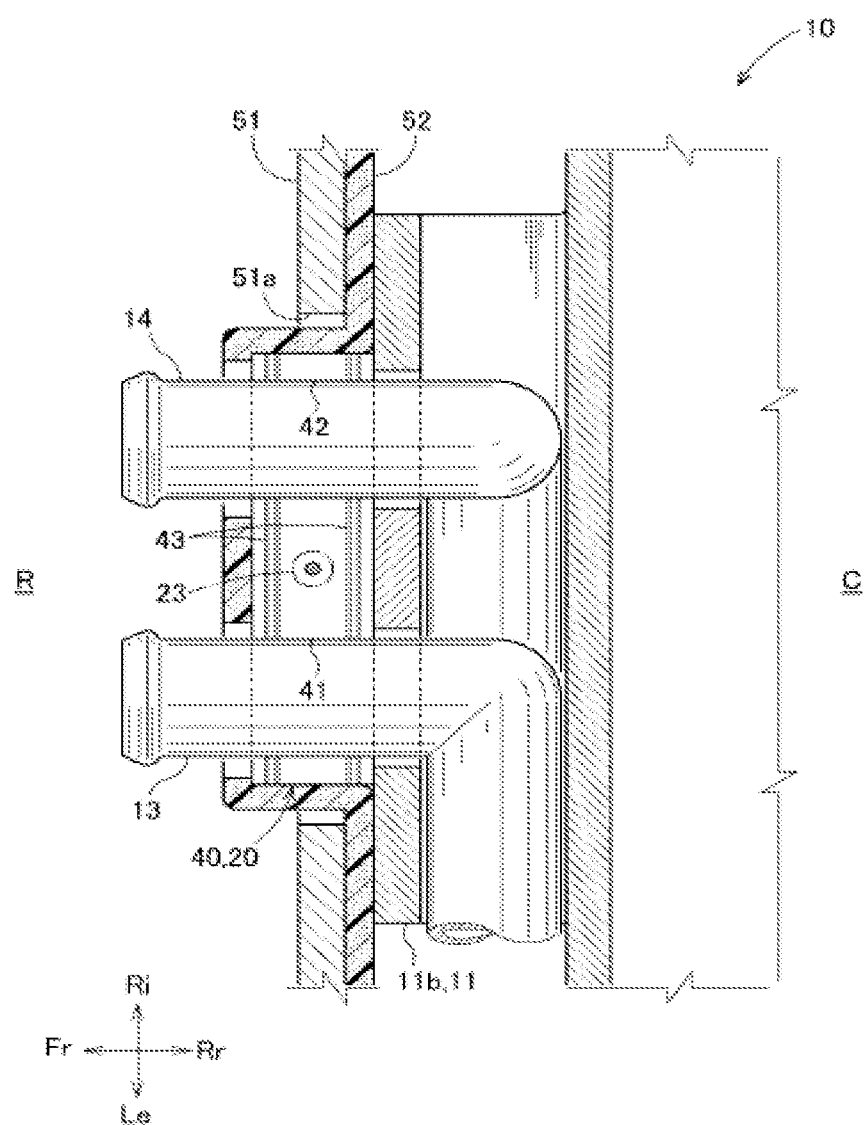
FIG. 3 is a sectional view of a state wherein the holder member and the hot water pipes shown in FIG. 2 are attached to a dash panel as seen from above.
Figure 4A:
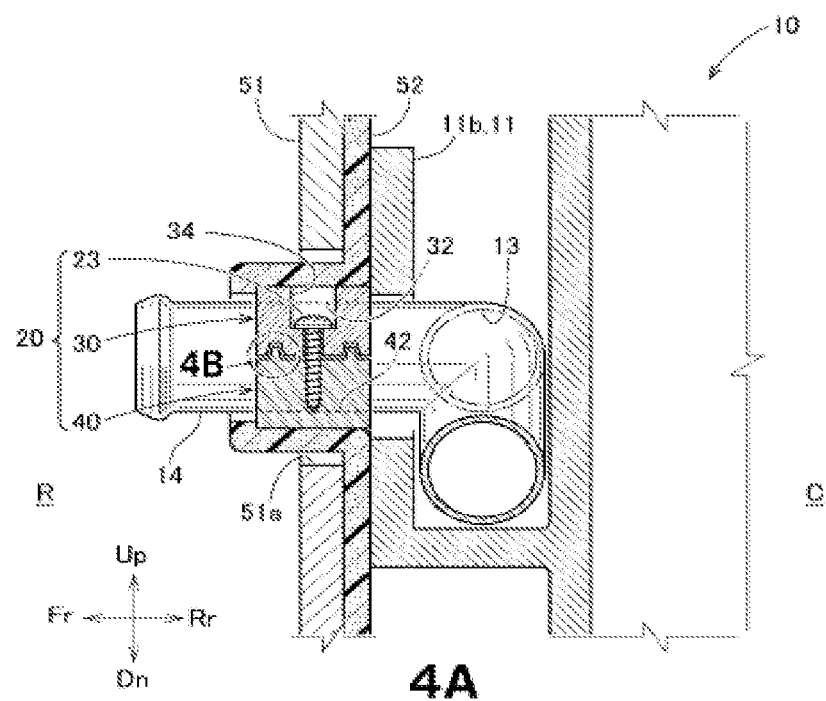
FIG. 4A is a sectional view of a state wherein the holder member and a hot water collecting pipe shown in FIG. 2 are attached to a dash panel as seen from a left side.

Reference will be made to FIG. 3 and FIG. 4A. The hot water pipes 13 and 14 are disposed in such a way as to pass through holes provided in the protruding portion 11b of the case, and not come into contact with the protruding portion 11b. This is because when the hot water pipes 13 and 14 come into contact with the protruding portion 11b, vibration received by the hot water pipes 13 and 14 in the forward compartment R is transmitted to the case 11 via the protruding portion 11b, which is undesirable.

Figure 2:
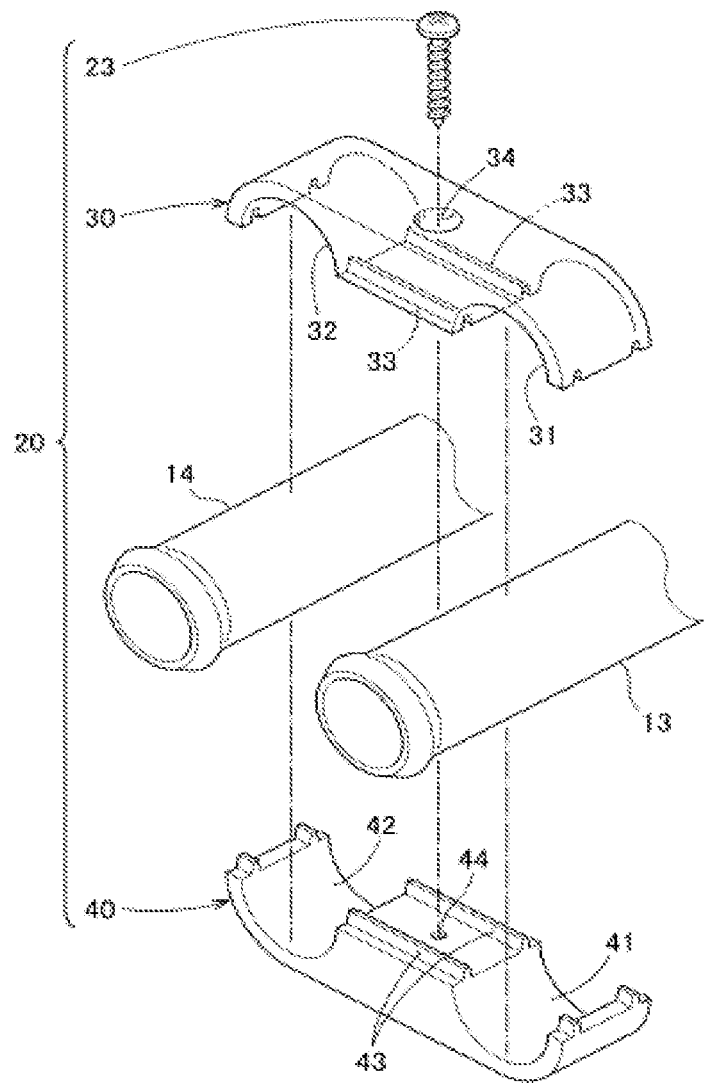
FIG. 2 is an exploded perspective view of a holder member and hot water pipes shown in FIG. 1.

Reference will be made to FIG. 2. The holder member 20 has a first holding portion 30 that comes into contact with an upper half periphery of each of the hot water pipes 13 and 14, a second holding portion 40 that opposes the first holding portion 30 and comes into contact with a lower half periphery of each of the hot water pipes 13 and 14, and a fastening portion 23 that fastens the first holding portion 30 and the second holding portion 40.

Reference will be made to FIG. 3 and FIG. 4A. The holder member 20 faces a panel hole 51a provided in the dash panel 51. An outer peripheral edge of the holder member 20 is of an elliptical form whose major axis extends from lower right to upper left along an inner peripheral face of the panel hole 51a (refer also to FIG. 1).

A grommet 52 of a rubber material for shock absorption is provided between the dash panel 51 and the holder member 20. One portion of the grommet 52 faces an interior of the panel hole 51a. A front face and an outer peripheral face of the holder member 20 are enclosed by the grommet 52, and a rear face is covered by the protruding portion 11b.

Reference will be made to FIG. 2. The first holding portion 30 is a member for which a metal (for example, an iron-based material) is used as a material. The first holding portion 30 has a first supply side holding portion 31, which presents an approximate U-form following an outer peripheral face of the hot water supply pipe 13 and holds the hot water supply pipe 13, a first collection side holding portion 32, which presents an approximate U-form following an outer peripheral face of the hot water collecting pipe 14 and holds the hot water collecting pipe 14, a recessed portion 33, which is formed in a concave form facing upward and extends horizontally, and a fastening portion through hole 34, whose inner diameter is greater than an outer diameter of the fastening portion 23 and through which the fastening portion 23 passes.

The second holding portion 40 is a member for which a metal (for example, an iron-based material) is used as a material. The second holding portion 40 has a second supply side holding portion 41, which presents an approximate U-form following the outer peripheral face of the hot water supply pipe 13 and holds the hot water supply pipe 13, a second collection side holding portion 42, which presents an approximate U-form following the outer peripheral face of the hot water collecting pipe 14 and holds the hot water collecting pipe 14, a protruding portion 43, which protrudes toward the recessed portion 33 in a position coinciding with the recessed portion 33, and a fastening hole 44, in which a leading end of the fastening portion 23 is fastened.

A metal such as aluminum, a resin, or the like can also be employed as a material of the first holding portion 30 and the second holding portion 40. Materials differing between the first holding portion 30 and the second holding portion 40 can also be employed.

Figure 4B:
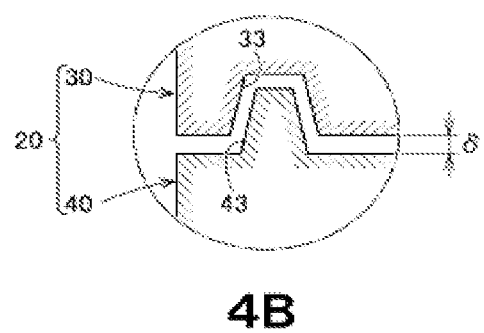
FIG. 4B is an enlarged view of a portion 4B of FIG. 4A.

Reference will also be made to FIG. 4B. The second holding portion 40 is provided opposing the first holding portion 30 across a gap 5. In other words, the first holding portion 30 and the second holding portion 40 are fastened to each other in a state wherein a predetermined gap is provided.

A dimensional error occurs within a predetermined range in each of the first holding portion 30, the second holding portion 40, the hot water supply pipe 13, and the hot water collecting pipe 14. A dimension of each part is set in such a way that even in a provisional case wherein errors in the first holding portion 30 and the second holding portion 40 are the greatest among possible errors, and errors in the hot water supply pipe 13 and the hot water collecting pipe 14 are the smallest among possible errors, a gap occurs between the first holding portion 30 and the second holding portion 40.

Reference will be made to FIG. 2. The fastening portion 23 is configured of a self-tapping screw, and is provided between the hot water supply pipe 13 and the hot water collecting pipe 14. Other than a screw, a bolt or the like can also be used, provided that the fastening portion 23 can fasten the first holding portion 30 and the second holding portion 40.

The first supply side holding portion 31 encloses an upper portion of the hot water supply pipe 13 over approximately half the periphery. More precisely, the first supply side holding portion 31 covers a length slightly less than that of the upper half periphery of the hot water supply pipe 13, with a circumferential direction as a reference.

The first collection side holding portion 32 encloses an upper portion of the hot water collecting pipe 14 over approximately half the periphery. More precisely, the first collection side holding portion 32 covers a length slightly less than that of the upper half periphery of the hot water collecting pipe 14, with a circumferential direction as a reference.

The recessed portion 33 is formed extending to both left and right ends of a lower face of the first holding portion 30, except in a region in which the first supply side holding portion 31 is formed and a region in which the first collection side holding portion 32 is formed. The recessed portion 33 is formed in two places, to the front and the rear. An arrangement can also be such that a direction in which the recessed portion 33 extends follows a direction in which the panel hole 51a (refer to FIG. 3) extends.

The second supply side holding portion 41 encloses a lower portion of the hot water supply pipe 13 over approximately half the periphery. More precisely, the second supply side holding portion 41 covers a length slightly less than that of the lower half periphery of the hot water supply pipe 13, with the circumferential direction as a reference.

The second collection side holding portion 42 encloses a lower portion of the hot water collecting pipe 14 over approximately half the periphery. More precisely, the second collection side holding portion 42 covers a length slightly less than that of the lower half periphery of the hot water collecting pipe 14, with the circumferential direction as a reference.

The protruding portion 43 is formed extending to both left and right ends of an upper face of the second holding portion 40, except in a region in which the second supply side holding portion 41 is formed and a region in which the second collection side holding portion 42 is formed. The protruding portion 43 is formed in two places, to the front and the rear. An arrangement can also be such that a direction in which the protruding portion 43 extends follows the direction in which the panel hole 51a (refer to FIG. 3) extends.

By each of the first supply side holding portion 31 and the second supply side holding portion 41 enclosing approximately a half periphery of the hot water supply pipe 13, approximately a whole periphery of the hot water supply pipe 13 is enclosed by the first supply side holding portion 31 and the second supply side holding portion 41.

Also, by each of the first collection side holding portion 32 and the second collection side holding portion 42 enclosing approximately a half periphery of the hot water collecting pipe 14, approximately a whole periphery of the hot water collecting pipe 14 is enclosed by the first collection side holding portion 32 and the second collection side holding portion 42.

A configuration may also be such that a protruding portion is formed in the first holding portion 30 and a recessed portion is formed in the second holding portion 40. Also, a configuration may be such that the recessed portion 33 is formed in a front portion of the first holding portion 30 and a protruding portion is formed in a rear portion, while the protruding portion 43 is formed in a front portion of the second holding portion 40 and a recessed portion is formed in a rear portion. Furthermore, the recessed portions and the protruding portions may be formed in reverse front and rear.

The heretofore described air conditioning device 10 achieves the following advantages.

Reference will be made to FIG. 4A and FIG. 4B. The first holding portion 30 and the second holding portion 40 are disposed across a gap, and fastened using the fastening portion 23. Assuming a case of adopting a setting wherein the first holding portion 30 and the second holding portion 40 are brought into close contact, a gap occurs between the hot water pipes 13 and 14 and the holder member 20 when either of the hot water pipes 13 and 14 is smaller due to a dimensional error, and the hot water pipes 13 and 14 cannot be held strongly. By fastening using the fastening portion 23, leaving a gap, the holder member 20 can be reliably fastened to the hot water supply pipe 13 and the hot water collecting pipe 14, even when there is dimensional variation in each of the holder member 20, the hot water supply pipe 13, and the hot water collecting pipe 14. Reference will be made to FIG. 1. By the hot water supply pipe 13 and the hot water collecting pipe 14 being held integrally, an apparent mass is increased, and a transmission of vibration to the case 11 and the like can be restricted. Because of this, the air conditioning device 10 having the hot water pipes 13 and 14 is such that quietness inside the vehicle cabin C can be increased.

Reference will be made to FIG. 2 and FIG. 4A. Approximately the whole periphery of the hot water supply pipe 13 is enclosed by the first supply side holding portion 31 and the second supply side holding portion 41, and approximately the whole periphery of the hot water collecting pipe 14 is enclosed by the first collection side holding portion 32 and the second collection side holding portion 42. By the hot water supply pipe 13 and the hot water collecting pipe 14 being held over approximately the whole periphery, the hot water supply pipe 13 and the hot water collecting pipe 14 can be held with greater strength.

The fastening portion 23 is provided between the hot water supply pipe 13 and the hot water collecting pipe 14. Both the hot water supply pipe 13 and the hot water collecting pipe 14 can be more reliably held, in addition to which the holder member 20 can be compact.

Reference will be made to FIG. 4A and FIG. 4B. The second holding portion 40 has the protruding portion 43, which protrudes toward the first holding portion 30 and extends in the direction in which the panel hole 51a extends (an approximately horizontal direction of the vehicle). Also, the first holding portion 30 has the recessed portion 33, which covers the protruding portion 43. By adopting a labyrinth structure, noise from the forward compartment R is restricted from being transmitted into the vehicle cabin C, and the inside of the vehicle cabin C can be rendered quiet. The same advantage can be obtained when the first holding portion 30 has a protruding portion and the second holding portion 40 has a recessed portion.

A metal is used as a material of the first holding portion 30 and the second holding portion 40. The apparent mass is increased, and transmission of vibration can be further restricted. This advantage is achieved by a metal being used as a material of at least one of the first holding portion 30 and the second holding portion 40. When a metal is used as a material of both the first holding portion 30 and the second holding portion 40, mass can be particularly increased, which is preferable.

Second Working Example

Next, an air conditioning device 10A according to a second working example will be described, based on the drawings.

Figure 5:
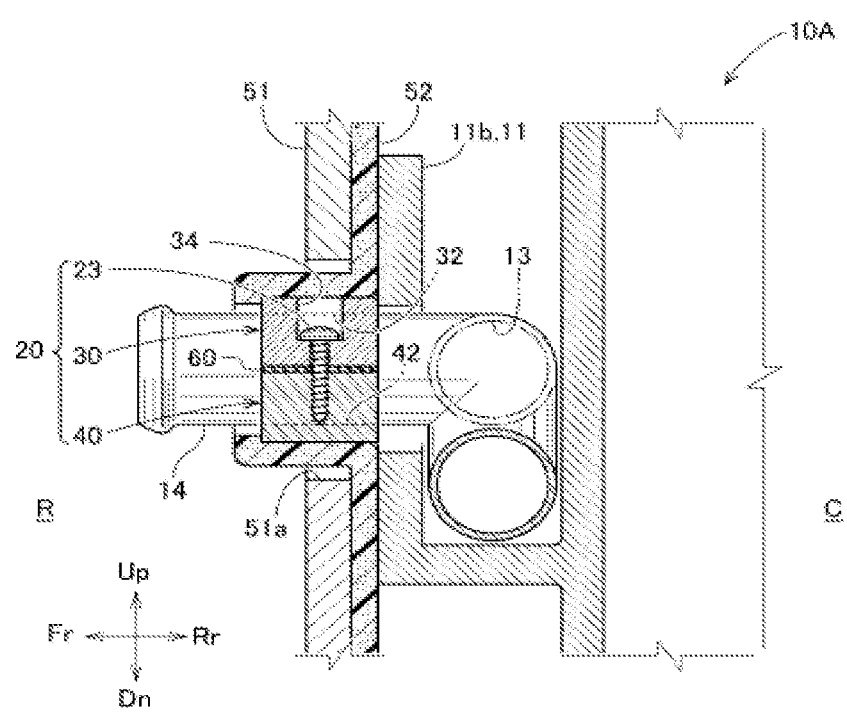
FIG. 5 is a sectional view of a state wherein a holder member and a hot water collecting pipe of a vehicle air conditioning device according to a second working example are attached to a dash panel as seen from a left side.

FIG. 5 is represented to correspond to FIG. 4A. The air conditioning device 1 OA according to the second working example is such that a sound insulating member 60 is sandwiched between the first holding portion 30 and the second holding portion 40 instead of the recessed portion 33 (refer to FIG. 4B) and the protruding portion 43 (refer to FIG. 4B). Other basic configurations are the same as those of the air conditioning device 10 according to the first working example (refer to FIG. 1). With regard to portions the same as those in the first working example, the same reference signs will be allotted, and a detailed description will be omitted.

The lower face of the first holding portion 30 is formed to be flat, and the upper face of the second holding portion 40 is also formed to be flat.

The sound insulating member 60 can be configured of a plate in which a material having excellent elasticity, such as rubber, is used, or of an adhesive or the like with which a gap formed between the first holding portion 30 and the second holding portion 40 is filled.

For example, when the sound insulating member 60 is configured of a plate made of rubber, the hot water pipes 13 and 14 can be held with sufficient strength by fastening the fastening portion 23 while causing the sound insulating member 60 to distort.

Also, when the sound insulating member 60 is configured by filling with an adhesive or the like, firstly, the first holding portion 30 and the second holding portion 40 are fastened using the fastening portion 23, attaining a state wherein the first holding portion 30 and the second holding portion 40 are held with sufficient strength. Subsequently, a gap between the first holding portion 30 and the second holding portion 40 is filled with an adhesive. Alternatively, using an adhesive that gradually hardens with the passing of time, the gap between the first holding portion 30 and the second holding portion 40 may firstly be filled with the adhesive, and the first holding portion 30 and the second holding portion 40 fastened using the fastening portion 23 while an elastic force of the adhesive remains. In this case, an epoxy-based resin or the like can be utilized as the adhesive.

The heretofore described hot water pipe holding structure also achieves predetermined advantages of the invention.

In addition, the sound insulating member 60 is sandwiched by the first holding portion 30 and the second holding portion 40. Noise from the forward compartment R is restricted from being transmitted into the vehicle cabin C, and the inside of the vehicle cabin C can be rendered quiet.

Third Working Example

Next, an air conditioning device 10B according to a third working example will be described, based on the drawings. A basic configuration relating to the air conditioning device 10B according to the third working example is the same as that of the air conditioning devices 10 and 10A according to the first working example and/or the second working example. With regard to portions the same as those in the first working example and/or the second working example, the same reference signs will be allotted, and a detailed description will be omitted.

Figure 6:
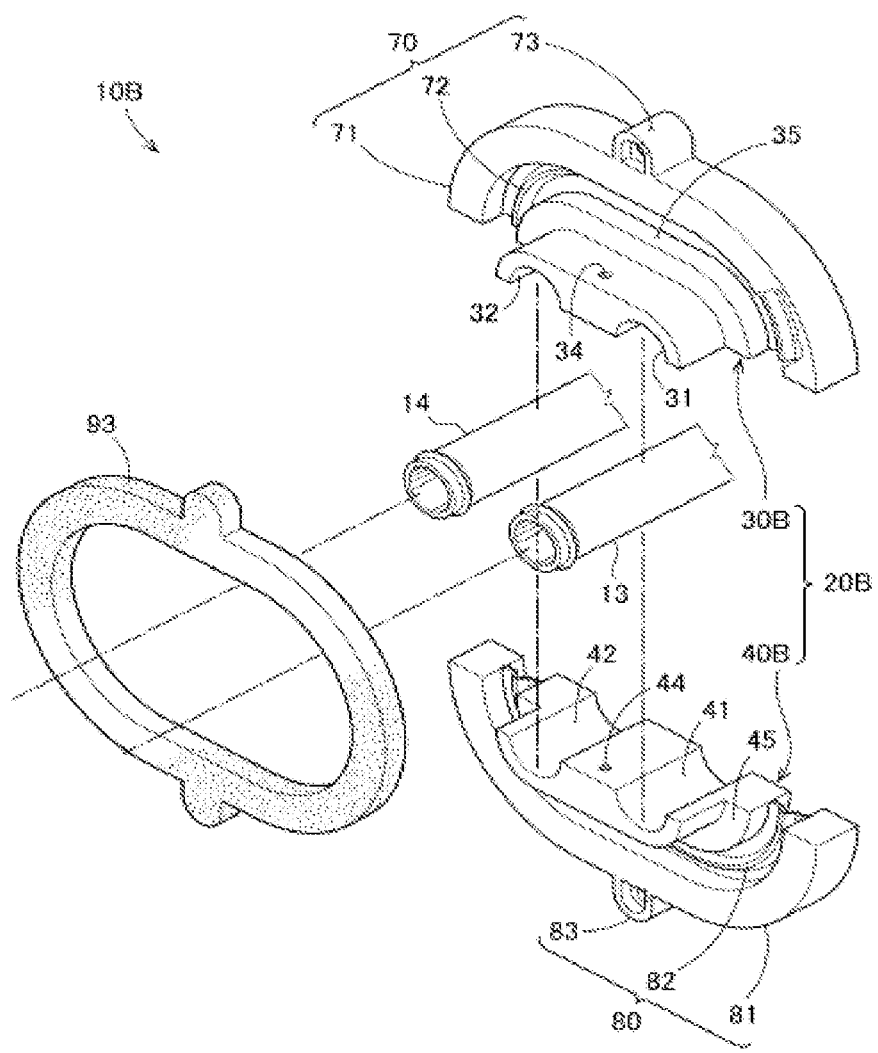
FIG. 6 is an exploded perspective view of a holder member and hot water pipes of a vehicle air conditioning device according to a third working example.
Figure 7:
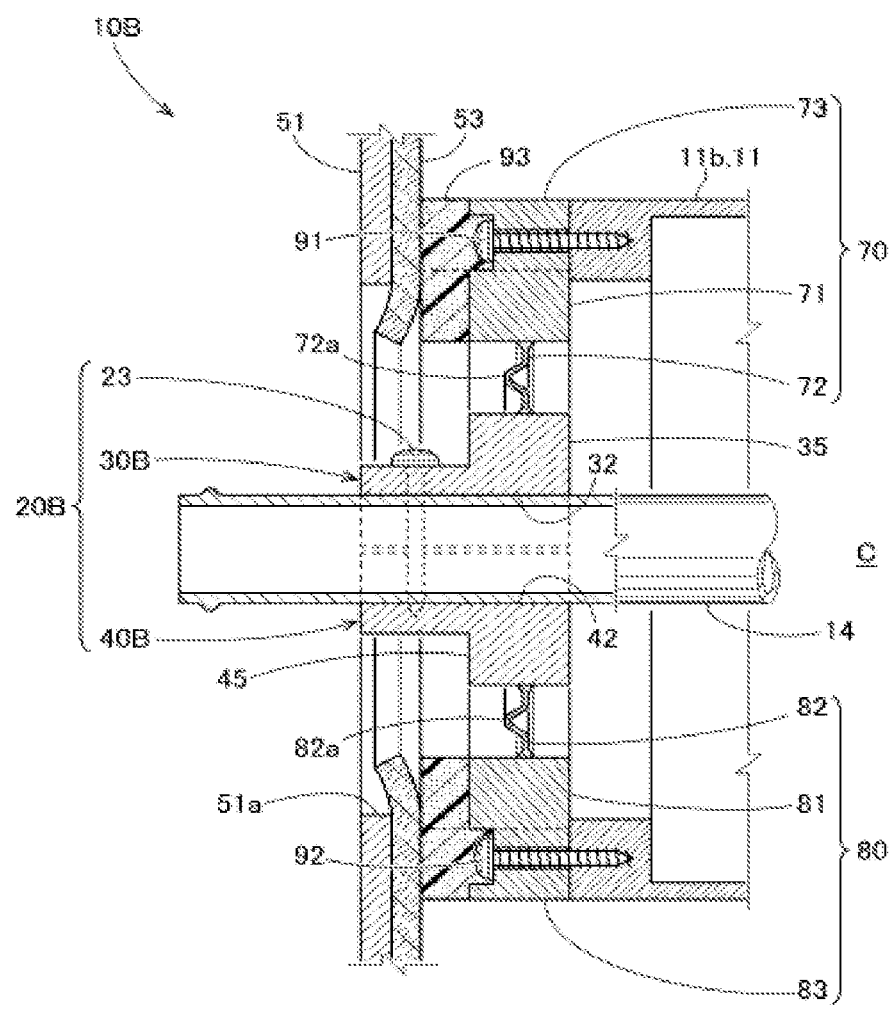
FIG. 7 is a sectional view of a state wherein the holder member and a hot water collecting pipe of the vehicle air conditioning device according to the third working example are attached to a dash panel as seen from a left side.

Reference will be made to FIG. 6 and FIG. 7. A holder member 20B configuring one portion of the air conditioning device 10B is such that a first vibration restricting portion 70, which restricts a transmission of vibration from a first holding portion 30B to the case 11, is provided between the case 11 and the first holding portion 30B, and a second vibration restricting portion 80, which restricts a transmission of vibration from a second holding portion 40B to the case 11, is provided between the case 11 and the second holding portion 40B.

The first holding portion 30B is such that in addition to the first supply side holding portion 31, the first collection side holding portion 32, and the fastening portion through hole 34, a first coupling portion 35 to be coupled to the first vibration restricting portion 70 is formed integrally. The first coupling portion 35 is formed offset to the rear of the fastening portion through hole 34, with a direction following axial lines of the hot water supply pipe 13 and the hot water collecting pipe 14 as a reference. Also, a volume of the first coupling portion 35 is preferably greater than a volume of a region in which the fastening portion through hole 34 is formed. This is because after the two hot water pipes 13 and 14 are fastened, an anti-vibration advantage can be increased with respect to input vibration.

The second holding portion 40B is such that in addition to the second supply side holding portion 41, the second collection side holding portion 42, and the fastening hole 44, a second coupling portion 45 to be coupled to the second vibration restricting portion 80 is formed integrally. The second coupling portion 45 is formed offset to the rear of the fastening hole 44, with a direction following the axial lines of the hot water supply pipe 13 and the hot water collecting pipe 14 as a reference. Also, a volume of the second coupling portion 45 is preferably greater than a volume of a region in which the fastening hole 44 is formed. This is because after the two hot water pipes 13 and 14 are fastened, an anti-vibration advantage can be increased with respect to input vibration.

The first coupling portion 35 and the second coupling portion 45 may also be formed to the front of the fastening portion through hole 34 and the fastening hole 44.

The first vibration restricting portion 70 has a first fixed portion 71, which is configured of a rigid body and fixed to the case 11, a first elastic portion 72, which couples the first fixed portion 71 and the first holding portion 30B and has greater elasticity than the first fixed portion 71, and a first case fastening portion 73, which is formed integrated with the first fixed portion 71 and is for fastening a fastening member 91 for fixing to the case 11.

Polypropylene, for example, can be used as a material of the first fixed portion 71. Also, an ethylene propylene diene monomer rubber (EPDM) can be used as a material of the first elastic portion 72. The first elastic portion 72 can also be said to be a region for restricting a transmission of vibration from the first holding portion 30B to the case 11.

The first elastic portion 72 is formed in a mountain-like form facing forward, and has a first displacement absorbing portion 72a that can absorb a displacement of a length from the first holding portion 30B to the first fixed portion 71 by distorting.

The second vibration restricting portion 80 has a second fixed portion 81, which is configured of a rigid body and fixed to the case 11, a second elastic portion 82, which couples the second fixed portion 81 and the second holding portion 40B and has greater elasticity than the second fixed portion 81, and a second case fastening portion 83, which is formed integrated with the second fixed portion 81 and is for fastening the fastening member 91 for fixing to the case 11.

Polypropylene, for example, can be used as a material of the second fixed portion 81. Also, an ethylene propylene diene monomer rubber (EPDM) can be used as a material of the second elastic portion 82. The second elastic portion 82 can also be said to be a region for restricting a transmission of vibration from the second holding portion 40B to the case 11. The second elastic portion 82 is formed in a mountain-like form facing forward, and has a second displacement absorbing portion 82a that can absorb a displacement of a length from the second holding portion 40B to the second fixed portion 81 by distorting.

The first holding portion 30B, the first fixed portion 71, and the first elastic portion 72 are formed integrally using two-color molding. Also, the second holding portion 40B, the second fixed portion 81, and the second elastic portion 82 are formed integrally using two-color molding.

A shock-absorbing member 93, which is a sponge-form member and restricts a transmission of vibration from the dash panel 51 to the case 11, is disposed between felt 53, which acts as a vehicle-side member provided in close contact with the dash panel 51, and the first vibration restricting portion 70, and between the felt 53 and the second vibration restricting portion 80.

The vibration restricting portions 70 and 80 can also be configured of only the elastic portions 72 and 82 respectively, with the elastic portions 72 and 82 being fastened directly to the case 11. Also, the material of the first fixed portion 71 and the second fixed portion 81 not being limited to polypropylene, nylon 6-6 or another resin can also be selected. Also, the material of the first elastic portion 72 and the second elastic portion 82 not being limited to ethylene propylene diene monomer rubber, hydrogenated nitrile rubber or another soft resin can be used, or the first elastic portion 72 and the second elastic portion 82 can be configured by forming a resin sheet into a bellows form.

Furthermore, the displacement absorbing portions 72a and 82a may be formed in a trough form facing rearward. Also, a transmission of vibration can also be restricted using material elasticity, without providing the displacement absorbing portions 72a and 82a in the elastic portions 72 and 82 respectively. When the displacement absorbing portions 72a and 82a are provided, an amount of displacement of the elastic portions 72 and 82 can be further increased, and vibration transmission can be further restricted.

The heretofore described hot water pipe holding structure also achieves predetermined advantages of the invention.

The first vibration restricting portion 70 is provided between the case 11 and the first holding portion 30B, and the second vibration restricting portion 80 is provided between the case 11 and the second holding portion 40B. Because of this, vibration can be restricted from being transmitted to the case 11 via the first holding portion 30B and the second holding portion 40B. Because of this, the air conditioning device 10B having the hot water pipes 13 and 14 is such that quietness inside the vehicle cabin C can be further increased.

The first vibration restricting portion 70 has the first fixed portion 71, which is configured of a rigid body, and the first elastic portion 72, which has greater elasticity than the first fixed portion 71. Also, the second vibration restricting portion 80 has the second fixed portion 81, which is configured of a rigid body, and the second elastic portion 82, which has greater elasticity than the second fixed portion 81. By the fixed portions 71 and 81 configured of rigid bodies being fixed to the case 11, an increase in a lifespan of a fixed region can be achieved.

The first holding portion 30B, the first fixed portion 71, and the first elastic portion 72 are formed integrally, and the second holding portion 40B, the second fixed portion 81, and the second elastic portion 82 are formed integrally. Because of this, work of attaching the holding portions 30B and 40B to the hot water supply pipe 13 and the hot water collecting pipe 14 respectively can be carried out easily.

A vehicle air conditioning device hot water pipe holding structure according to the invention is not limited to those shown in the working examples. For example, working examples can be combined. In other words, a labyrinth structure of an uneven form can be configured of a first holding portion and a second holding portion, and furthermore, a sound insulating member made from a rubber plate can be inserted into a gap between the first holding portion and the second holding portion. Alternatively, a labyrinth structure of an uneven form can be configured of a first holding portion and a second holding portion, and a gap can be filled with an adhesive. Sound insulation improves, and retention of a sound insulating member can also be improved.

Furthermore, when the holder member 20B is supported via the vibration restricting portions 70 and 80, a labyrinth structure of an uneven form can be configured by opposing faces of the first holding portion 30B and the second holding portion 40B (refer to reference signs 33 and 43). Also, when the holder member 20B is supported via the vibration restricting portions 70 and 80, the sound insulating member 60 formed of a rubber plate or an adhesive can be inserted into a gap formed between the first holding portion 30B and the second holding portion 40B.

Also, the first holding portion 30B and the first coupling portion 35 may be configured of separate bodies, and the second holding portion 40B and the second coupling portion 45 may be configured of separate bodies.

Provided that the effects and the advantages of the invention are achieved, the invention is not limited to the working examples.

The vehicle air conditioning device hot water pipe holding structure according to the invention is suitable in a vehicle in which an engine is used as a power source.

DESCRIPTION OF REFERENCE NUMERALS AND SIGNS 10, 10A, 10B: vehicle air conditioning device
11 case, 11a: internal space
12: heater core
13: hot water supply pipe
14: hot water collecting pipe
20, 20B: holder member
30, 30B: first holding portion
31: first supply side holding portion
32: first collection side holding portion
33: recessed portion
40, 40B: second holding portion
41: second supply side holding portion
42: second collection side holding portion
43: protruding portion
51: dash panel, 51a panel hole
60: sound insulating member
70: first vibration restricting portion
71: first fixed portion
72: first elastic portion
80: second vibration restricting portion
81: second fixed portion
82: second elastic portion C: vehicle cabin
R: forward compartment

The invention claimed is:

1. A vehicle air conditioning device hot water pipe holding structure, comprising:
   a case, disposed inside a vehicle cabin separated from a forward compartment by a dash panel, in which an internal space is formed;
   a heater core that is disposed in the internal space and warms air that flows into the internal space;
   a hot water supply pipe that is provided in an exterior of the case and is configured to supply hot water to the heater core;
   a hot water collecting pipe that is provided in an exterior of the case and collects hot water that has passed through an interior of the heater core; and
   a holder member that holds the hot water supply pipe and the hot water collecting pipe,
   wherein the holder member has a first holding portion that comes into contact with the hot water supply pipe and the hot water collecting pipe, a second holding portion that opposes the first holding portion, is provided across a gap, and comes into contact with the hot water supply pipe and the hot water collecting pipe, and a fastening portion that fastens the first holding portion and the second holding portion,
   wherein the first holding portion has a first supply side holding portion that presents an approximate U-form following an outer peripheral face of the hot water supply pipe and holds the hot water supply pipe, and a first collection side holding portion that presents an approximate U-form following an outer peripheral face of the hot water collecting pipe and holds the hot water collecting pipe,
   wherein the second holding portion has a second supply side holding portion that presents an approximate U-form following an outer peripheral face of the hot water supply pipe and holds the hot water supply pipe, and a second collection side holding portion that presents an approximate U-form following an outer peripheral face of the hot water collecting pipe and holds the hot water collecting pipe; and
   wherein a first vibration restricting portion that restricts a transmission of vibration from the first holding portion to the case is provided between the case and the first holding portion, and a second vibration restricting portion that restricts a transmission of vibration from the second holding portion to the case is provided between the case and the second holding portion.

2. The vehicle air conditioning device hot water pipe holding structure according to claim 1, wherein approximately a whole periphery of the hot water supply pipe is enclosed by the first supply side holding portion and the second supply side holding portion, and approximately a whole periphery of the hot water collecting pipe is enclosed by the first collection side holding portion and the second collection side holding portion.

3. The vehicle air conditioning device hot water pipe holding structure according to claim 1, wherein the fastening portion is provided between the hot water supply pipe and the hot water collecting pipe.

4. The vehicle air conditioning device hot water pipe holding structure according to claim 1, wherein the first vibration restricting portion has a first fixed portion that is configured of a rigid body and is fixed to the case, and a first elastic portion that couples the first fixed portion and the first holding portion and has greater elasticity than the first fixed portion, and the second vibration restricting portion has a second fixed portion that is configured of a rigid body and is fixed to the case, and a second elastic portion that couples the second fixed portion and the second holding portion and has greater elasticity than the second fixed portion.

5. The vehicle air conditioning device hot water pipe holding structure according to claim 4, wherein the first holding portion, the first fixed portion, and the first elastic portion are formed integrally, and the second holding portion, the second fixed portion, and the second elastic portion are formed integrally.

6. The vehicle air conditioning device hot water pipe holding structure according to claim 1, wherein the holder member faces a panel hole opened in the dash panel, either one of the first holding portion and the second holding portion has a protruding portion that protrudes toward the other and extends in a direction in which the panel hole extends, and the other of the first holding portion and the second holding portion has a recessed portion that covers the protruding portion.

7. The vehicle air conditioning device hot water pipe holding structure according to claim 1, wherein the holder member faces a panel hole opened in the dash panel, and a sound insulating member that restricts sound from passing through the gap is sandwiched by the first holding portion and the second holding portion.

8. The vehicle air conditioning device hot water pipe holding structure according to claim 1, wherein a metal is used as a material of at least one of the first holding portion and the second holding portion.

* * * * *